United States Patent [19]
Nozaki et al.

[11] Patent Number: 5,527,583
[45] Date of Patent: Jun. 18, 1996

[54] STRUCTURE FOR ATTACHMENT OF WEATHER STRIP

[75] Inventors: Masahiro Nozaki; Atsushi Hikosaka, both of Nakashima-gun, Japan

[73] Assignee: Toyoda Gosei Co., Ltd., Aichi-ken, Japan

[21] Appl. No.: 357,925

[22] Filed: Dec. 16, 1994

[30] Foreign Application Priority Data

| Dec. 16, 1993 | [JP] | Japan | 5-343865 |
| Apr. 28, 1994 | [JP] | Japan | 6-114520 |
| Apr. 30, 1994 | [JP] | Japan | 6-114596 |
| Apr. 30, 1994 | [JP] | Japan | 6-114598 |
| Jun. 17, 1994 | [JP] | Japan | 6-159264 |
| Aug. 2, 1994 | [JP] | Japan | 6-200237 |
| Sep. 2, 1994 | [JP] | Japan | 6-234303 |
| Sep. 21, 1994 | [JP] | Japan | 6-252846 |

[51] Int. Cl.$^6$ .................................. B60J 10/02
[52] U.S. Cl. .................. 428/99; 428/31; 428/214; 428/215; 428/217; 49/475.1; 296/93; 296/146.9
[58] Field of Search ................ 428/31, 99, 214, 428/215, 217, 31; 49/475.1, 495.1; 296/93, 146.9

[56] References Cited

U.S. PATENT DOCUMENTS

| 5,149,169 | 9/1992 | Nozaki | 296/206 |
| 5,154,952 | 10/1992 | Nozaki | 428/31 |
| 5,304,409 | 4/1994 | Nozaki | 428/122 |
| 5,356,194 | 10/1994 | Takeuchi | 49/475.1 |

FOREIGN PATENT DOCUMENTS

| 111738 | 11/1986 | European Pat. Off. |
| 233552 | 8/1987 | European Pat. Off. |
| 357973 | 3/1990 | European Pat. Off. |
| 1-68218 | 5/1989 | Japan |
| 1-112110 | 7/1989 | Japan |

Primary Examiner—Alexander S. Thomas
Attorney, Agent, or Firm—Cushman Darby & Cushman

[57] ABSTRACT

A structure for attachment of a weather strip to an opening of a vehicle body, which is opened and closed by a closing member. A base portion of the weather strip is bonded with two double-sided adhesive tapes to the vehicle body in the longitudinal direction thereof. The outer double-sided adhesive tape has thickness greater than that of the inner double-sided adhesive tape, and the material of the outer double-sided adhesive tape is softer than that of the inner double-sided adhesive tape.

13 Claims, 14 Drawing Sheets

STRUCTURE FOR ATTACHMENT OF WEATHER STRIP

The priority applications, Japanese Patent Application No. Hei 5-343865, filed in Japan on Dec. 16, 1993; Japanese Patent Application No. Hei 6-114520, filed in Japan on Apr. 28, 1994; Japanese Patent Application No. Hei 6-114596, filed in Japan on Apr. 30, 1994; Japanese Patent Application No. Hei 6-114598, filed in Japan on Apr. 30, 1994; Japanese Patent Application No. Hei 6-159264, filed in Japan on Jun. 17, 1994; Japanese Patent Application No. Hei 6-200237, filed in Japan on Aug. 2, 1994; Japanese Patent Application No. Hei 6-234303, filed in Japan on Sep. 2, 1994; and Japanese Patent Application No. Hei 6-252846, filed in Japan on Sep. 21, 1994 are hereby incorporated into the present specification by this reference.

BACKGROUND OF THE INVENTION

1. Field of the Invention

The present invention relates to weather strips for motor vehicles, and, more particularly, to a structure for attachment of weather strips to openings of vehicle bodies, which are closed and opened by closing members such as doors.

2. Description of Related Art

Along door openings formed in a side body of a motor vehicle, for example, as shown in FIG. 1, weather strips W are installed along a roof side rail 10 and a center pillar 12 to provide seals around door window panes 14. These weather strips W are attached to vehicle bodies with retainers (Japanese Utility Model application laid-open No. Hei 1-68218).

More specifically, as shown in FIG. 2, which is a cross-sectional view taken along the line 2—2 of FIG. 1, a retainer 16 is secured to a bottom wall of the roof side of rail 10, which defines a door opening of a vehicle body, and a tubular weather strip W1 is fitted in the retainer 16. Furthermore, as shown in FIG. 3, which is a cross-sectional view taken along the line 3—3 of FIG. 1, retainers 17 and 18 are respectively installed along front and rear surfaces of an outer panel of the center pillar 12. A weather strip W2 is composed of weather strips W2A and W2B on which front and rear door window panes 14 respectively abut upon closing of a vehicle door. These weather strips W2A and W2B are respectively fitted in the retainers 17 and 18. In FIGS. 2 and 3, reference numeral 20 denotes a roof side molding, 21, 22 and 23 denote opening trims. The retainers are secured to vehicle bodies with screws or the like, and seal members are interposed between the retainers and the vehicle bodies to provide a good seal therebetween.

Recently, the adhesive properties of double-sided adhesive tapes have been improved. Further, it has been necessary to reduce the manufacturing costs of vehicles. Under the above circumstances, the double-sided adhesive tapes have been used frequently to attach the weather strips in place of the retainers. (Japanese Utility Model application laid-open No. Hei 1-112110).

Namely, in the case of weather strips for attachment around door openings, for example, as shown in FIG. 4, a base portion 28 of a weather strip W3 is bonded to a bottom wall 11 of a roof side rail with a band-shaped double-sided adhesive tape 24 of a width nearly equal to or slightly less than that of the base portion 28. In the drawing, reference numeral 25 denotes a drip moulding, and numeral 26 denotes an opening trim.

The double-sided adhesive tape (hereinafter merely called "adhesive tape") generally has a thickness of about 10 mm. If the adhesive tape is too thin, the adhesive tape cannot smoothly cover the step-like surface of the bottom wall 11, which is formed around joints therein. This causes the adhesive tape not to closely contact the bottom wall 11, thereby forming spaces between the adhesive tape and the vehicle body. This degrades the adhesive and sealing properties of the weather strip against the vehicle body.

In order to improve sealing performance, it is preferable to use thicker adhesive tapes. However, when thick and wide adhesive tapes are curved in conformity to corner portions of vehicle bodies around door openings, they are likely to be undesirably buckled or deformed due to the difference in external diameter and internal diameter of curved adhesive tapes. This results in the thick and wide adhesive tapes not being bonded securely to the vehicle bodies and they may peel-off therefrom. As a result, the sealing properties between the weather strips and the vehicle bodies is degraded. Additionally, the production costs of the thick adhesive tapes are expensive.

In order to solve the above-described problems, soft adhesive tapes may be used. The adhesive tapes are generally composed of a band-shaped foamed portion and adhesive layers provided on both sides of the band-shaped foamed portion. These adhesive tapes can be made soft by varying the stiffness of the foamed portion. The resulting soft adhesive tapes can deform in conformity to the step-like surface of the vehicle bodies to which the weather strips are attached. When a door is closed, the door window pane presses the weather strips attached to the vehicle body to generate such forces as to pull and distort the weather strips. If such forces are repeatedly applied, the soft foamed portions of the adhesive tapes are likely to be damaged.

In the case that long weather strips bonded to a roof side rail and a pillar, which define a door opening, the adhesive tapes are likely to deviate from the predetermined attaching positions or to be distorted. This causes lowering of the sealing properties thereof. Accordingly, in attaching weather strips with adhesive tapes, skill and close attention have been conventionally required, so that good work efficiency has not been conventionally achieved.

SUMMARY OF THE INVENTION

Accordingly, it is an object of the present invention to provide a structure for attaching weather strips to a vehicle body with adhesive tapes, which improves both stability in attachment of the weather strips and sealing properties between the weather strips and the vehicle body.

It is another object of the present invention to provide a structure for attaching weather strips to a vehicle body with adhesive tapes, which enables attachment of the weather strips to predetermined positions with good work efficiency.

With the structure for attaching weather strips in accordance with the present invention, in order to attain the objects of improving both the stability in attachment of the weather strips to a vehicle body, and the sealing properties therebetween, a base portion of the weather strip is bonded to the vehicle body with a plurality of longitudinally separated adhesive tapes. An outermost adhesive tape has a thickness greater than that of an innermost adhesive tape, and/or the outermost adhesive tape is made of material softer than that of the innermost adhesive tape.

The sealing properties of the weather strip against the vehicle body around a door opening depends mainly on the outermost adhesive tape. By using a thick or soft adhesive tape as the outermost adhesive tape, the step-like surface of the vehicle body defining the door opening is cancelled. Furthermore, by using a plurality of narrow adhesive tapes, they can be easily curved in conformity to corners around a door opening, thereby effecting improved adhesion and sealing properties. By using a solid adhesive tape as the innermost adhesive tape, improved stability of attachment of weather strips can be achieved, and by using a thin adhesive tape as the innermost adhesive tape, the material costs can be reduced and accordingly, the production costs can be lowered.

In addition, with the present invention, in order to attain the object of improving the work efficiency in attachment of weather strips, the structure has engaging means which engages the weather strips and the vehicle body with each other to position the weather strips on the vehicle body. The positioned weather strips are bonded to the vehicle body with double-sided adhesive tapes. With this structure, the weather strips can be attached to precise positions with good work efficiency.

Other objects, features and characteristics of the present invention will become apparent upon consideration of the following description and the appended claims with reference to the accompanying drawings, all of which form part of this specification.

DETAILED DESCRIPTION OF THE PRESENTLY PREFERRED EXEMPLARY EMBODIMENTS

Figure 5:
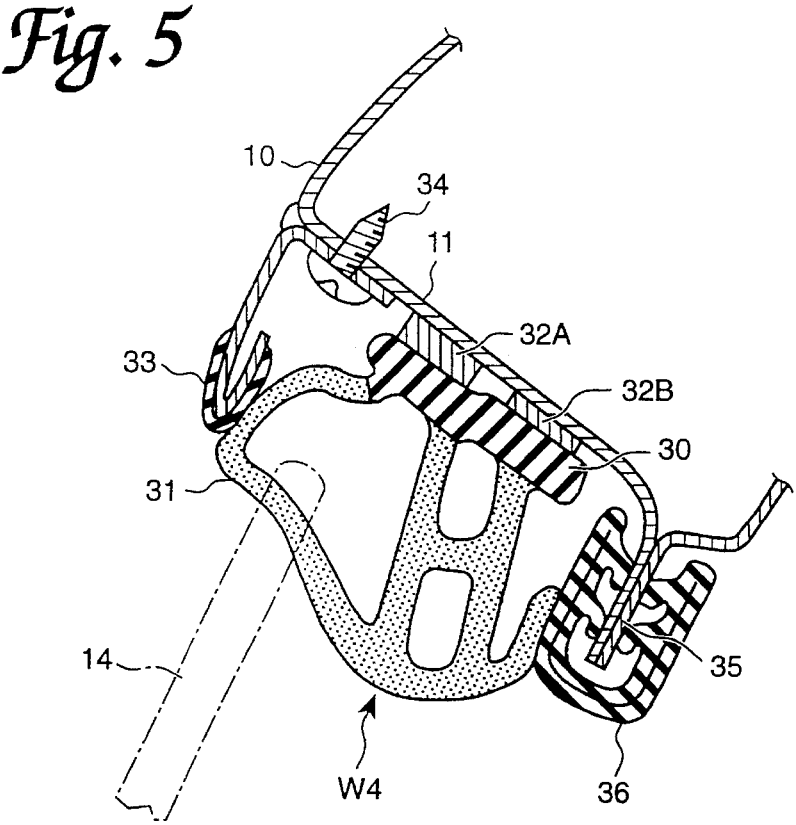
FIG. 5 is a cross-sectional view of a first embodiment of a structure in accordance with the present invention, taken along the line 2—2 of FIG. 1.

FIG. 5 illustrates a first embodiment of a weather strip structure provided in accordance with the present invention. As shown, a roof side weather strip W4 has a tubular configuration, and includes a base portion 30 made of solid rubber, and a sealing portion 31 made of sponge rubber. This weather strip W4 is formed by extrusion, and is attached to a bottom wall 11 of a roof side rail 10 of a motor vehicle. When a frameless door is closed, a seal wall of the sealing portion 31 is pushed-up by a door window pane 14.

The base portion 30 of the weather strip W4 is bonded to the bottom wall 11 with two adhesive tapes 32A and 32B which respectively extend in the longitudinal direction of the weather strip W4, parallel to each other. The outer adhesive tape 32A is thicker than the inner adhesive tape 32B.

A moulding 33 is attached along an outer side wall of the roof side rail 10 with screws 34 and covers an outside surface of the weather strip W4. An opening trim 36 is attached to a flange 35 protruding from an inner size edge of the bottom wall 11.

With the present embodiment, the thick adhesive tape 32A enables the weather strip W4 to come into close contact with the bottom wall 11 and to be bonded thereto without generating any space therebetween, even if the bottom wall 11 has step-like surface. Furthermore, since the adhesive tape 32B is thin, it can be curved in conformity with front and rear corners of the bottom wall 11 without any undesirable buckling or deformation. Thus, the adhesive tape 32A achieves good adhesion and sealing properties between the weather strip W4 and the roof side rail 10 of the vehicle body.

The inner adhesive tape 32B is thinner than the outer adhesive tape 32A, so that there is the possibility that the adhesive tape 32B does not come into close contact with the bottom wall 11 to generate small spaces therebetween. However, the sealing properties of the weather strip W4 can be sufficiently achieved by the outer adhesive tape 32A, and accordingly, the adhesive tape 32B does not deteriorate the sealing performance of the weather strip W4. Furthermore, since the adhesive tape 32B is thinner than the adhesive tape 32A, the total material costs of the adhesive tapes are not increased even though the adhesive tape 32A is thick.

The preferable thickness of the adhesive tape 32A is between about 1.2 and about 1.6 mm, and that of the inner adhesive tape 32B is between about 0.4 and about 0.8 mm.

In place of two parallel adhesive tapes, three parallel adhesive tapes may be used. In this case, the thickness of three adhesive tapes may be increased from the innermost tape outwardly, or the inner two tapes may deformed to have the same thickness, while the outermost tape may be formed to have a thickness greater than that of the inner two tapes.

Figure 6:
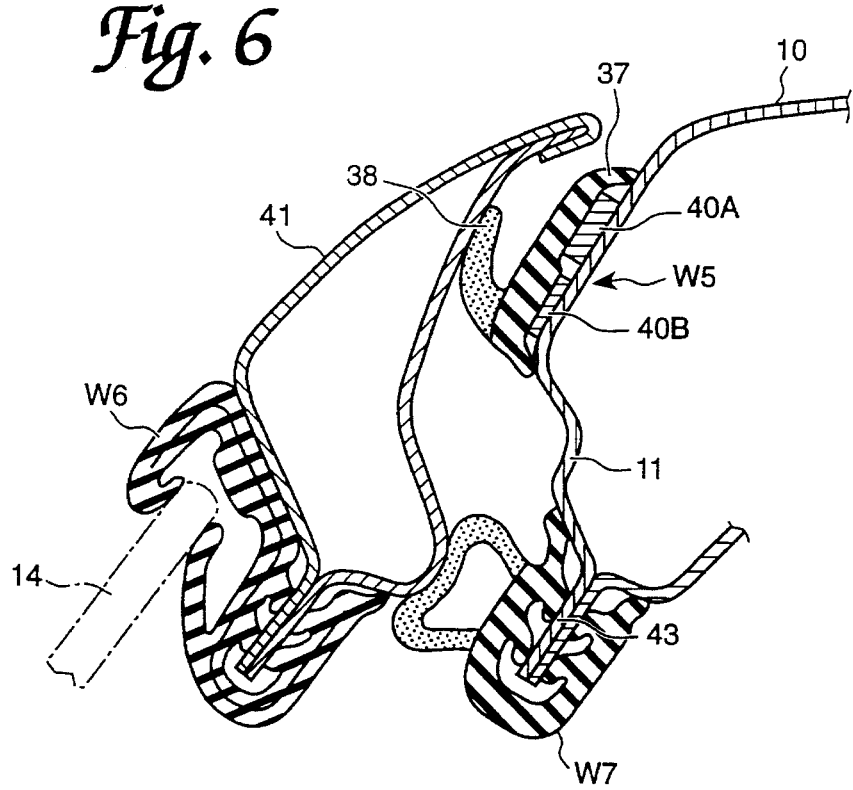
FIG. 6 is a cross-sectional view of a second embodiment of a structure in accordance with the present invention, taken along the line 2—2 of FIG. 1.

FIG. 6 illustrates a second embodiment of a weather strip structure of the present invention. As shown, a door of a vehicle has a door frame 41. A weather strip W5 is attached along a roof side rail 10 to abut an inner surface of the door frame 41 and to define a drip.

The weather strip W5 has a base portion 37 made of solid rubber and a lip-shaped sealing portion 38. The base portion 37 is bonded to an outer side wall or the roof side rail 10 with adhesive tapes 40A and 40B. Similar to the first embodiment, the outer adhesive tape 40A is thicker than the inner adhesive tape 40B. The structure of the second embodiment achieves substantially the same operational advantages as those of the first embodiment.

Reference numeral W6 denotes a door weather strip attached to the door frame 41 to provide a seal around a door window panes 14, and W7 is an opening weather strip attached to a flange 43 protruding from an inner side edge of the roof side rail 10 to abut the inner surface of the door frame 41.

Figure 7:
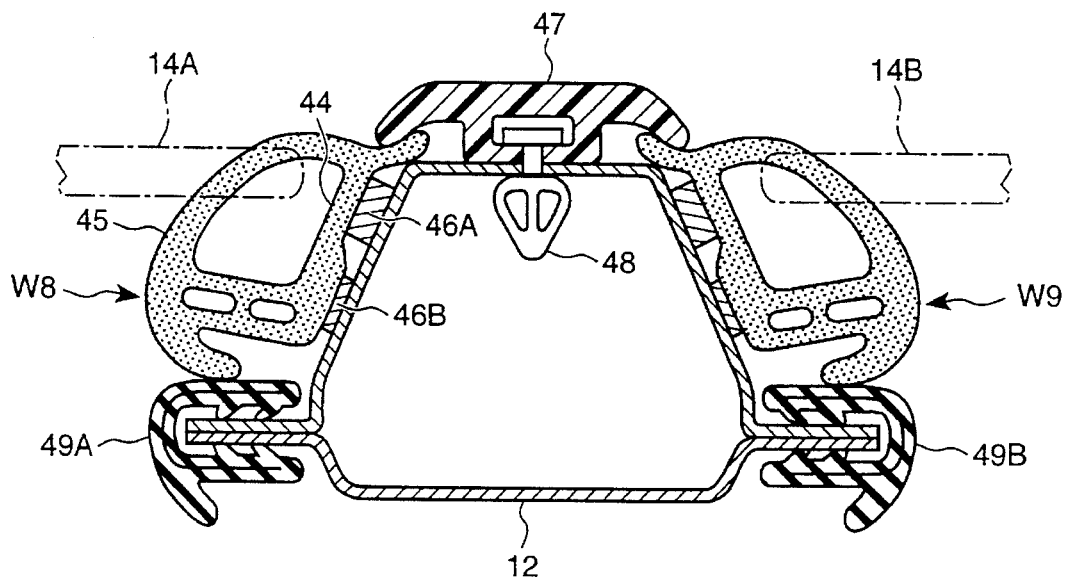
FIG. 7 is a cross-sectional view of a third embodiment of a structure in accordance with the present invention, taken along the line 3—3 of FIG. 1.

FIG. 7 illustrates a third embodiment of a weather strip structure provided accordance with the present invention. As shown, weather strips W8 and W9 are attached, respectively, to front and rear side surfaces of a center pillar 12 to seal a rear edge of a front door window pane 14A and a front edge of a rear door window pane 14B.

The weather strips W8 and W9 have substantially the same construction, each being a tubular extruded body made of sponge rubber. Each of the weather strips W8 and W9 has a base portion 44 and a sealing portion 45. The base portion 44 is bonded to the center pillar 12 with two adhesive tapes 46A and 46B disposed in a parallel relation. The thickness of the outer adhesive tape 46A is greater than that of the inner adhesive tape 46B.

A pillar moulding 47 is attached to a central portion of the center pillar 12 with clips 48. Both side edges of the pillar moulding 47 respectively press outer side edges of the weather strips W8 and W9. Reference numerals 49A and 49B respectively denote a trim for attachment to front and rear flanges of the center pillar 12.

The outer thick adhesive tape 46A has good adhesion against the center pillar 12, and accordingly, achieves good sealing performance even if water intrudes through spaces between side edges of the pillar moulding 47 and outer side edges of the weather strips W8 and W9.

Figure 1:
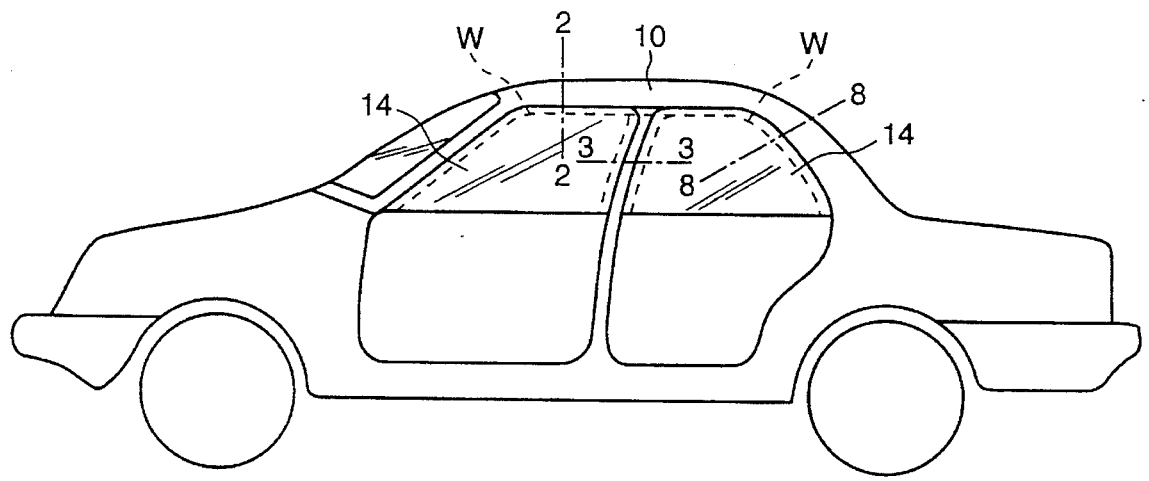
FIG. 1 is a side elevational view of a motor vehicle to which a structure for attachment of a weather strip, in accordance with the present invention, is applied.
Figure 2:
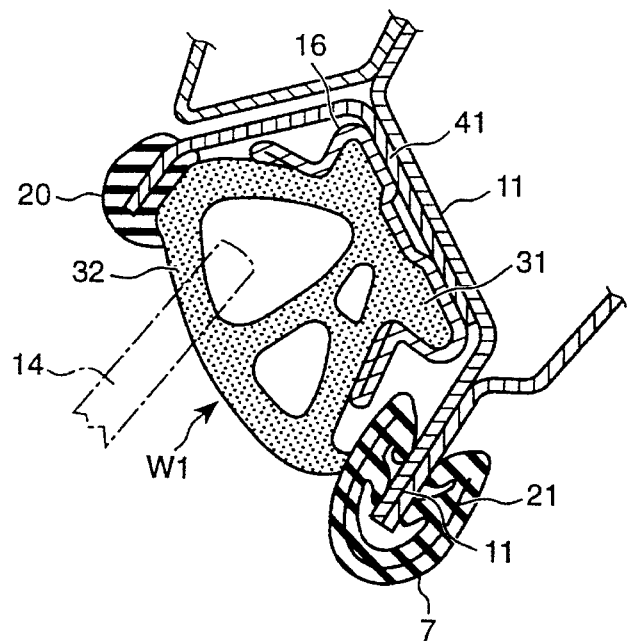
FIG. 2 is a cross-sectional view of a conventional structure for attachment of a weather strip, taken along the line 2—2 of FIG. 1.
Figure 3:
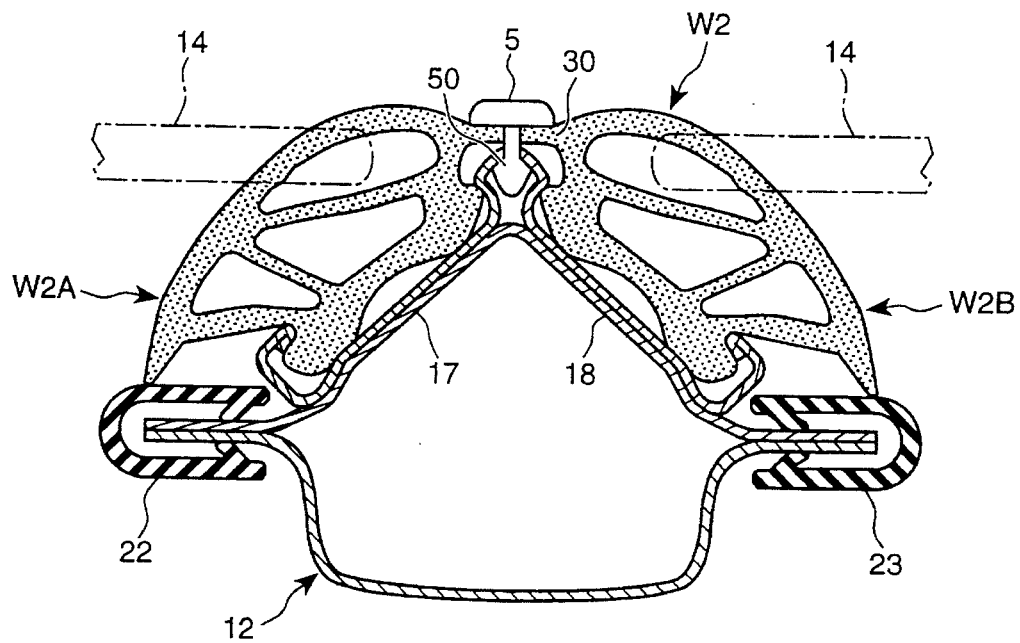
FIG. 3 is a cross-sectional view of a conventional structure taken along the line 3—3 of FIG. 1.
Figure 4:
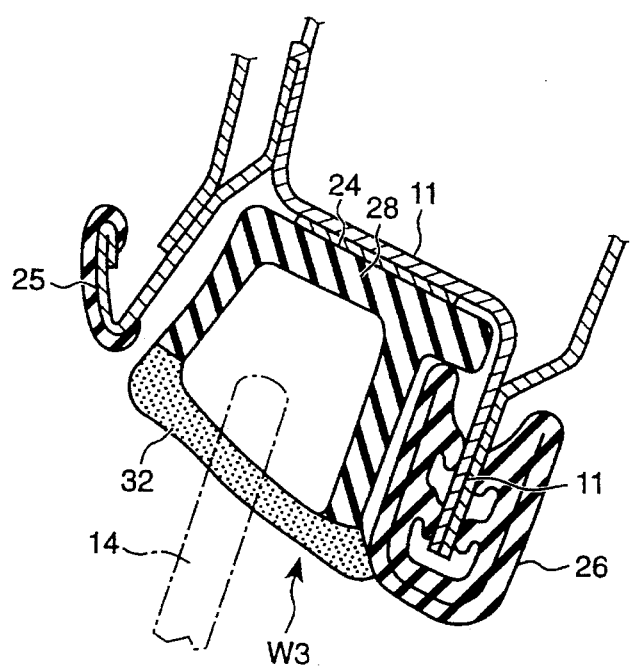
FIG. 4 is a cross-sectional view of another conventional structure taken along the line 2—2 of FIG. 1.
Figure 8:
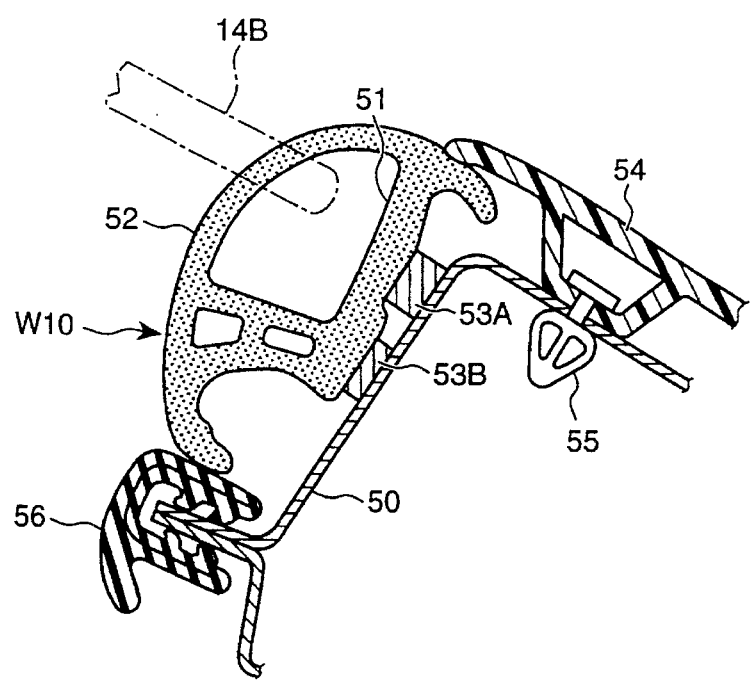
FIG. 8 is a cross-sectional view of a fourth embodiment of a structure in accordance with the present invention taken along the line 8—8 of FIG. 1.

FIG. 8 is a cross-sectional view of a fourth embodiment of a weather strip structure provided in accordance with the present invention, taken along the line 8—8 of FIG. 1. As shown, a weather strip W10 has a tubular body and has a base portion 51 and a sealing portion 52. The base portion 51 is attached to a quarter pillar 50 with two adhesive tapes 53 and 53B. The sealing portion 52 seals a rear edge of a rear door window pane 14B. The thickness of the outer adhesive tape 53A is greater than that or inner adhesive tape 53B.

A pillar garnish 54 is attached to the quarter pillar 50 with clips 55. A front edge of the pillar garnish 54 abuts an outer side edge of the weather strip W10. Reference numeral 56 denotes a trim attached to a flange of the quarter pillar 50 for abutment against the inner side edge of the weather strip W10. With the fourth embodiment, operational advantages, substantially the same as those of the third embodiment, can be achieved.

Figure 9A:
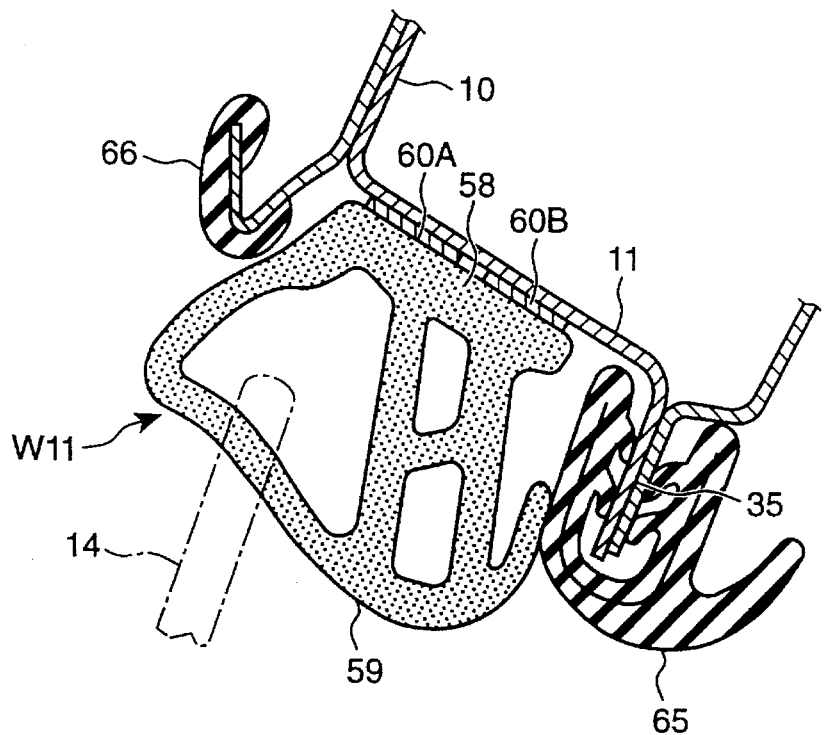
FIG. 9(A) is a cross-sectional view of a fifth embodiment of a structure in accordance with the present invention taken along the line 2—2 of FIG. 1.
Figure 9B:
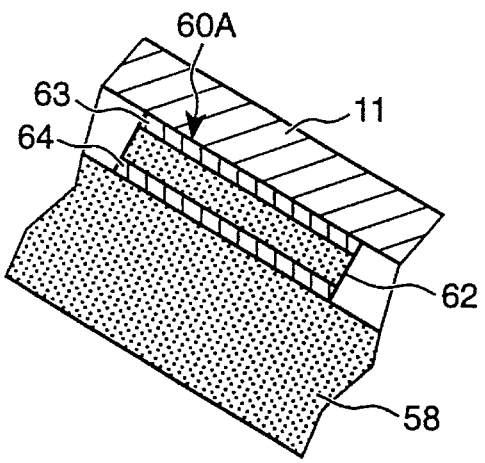
FIG. 9(B) is an enlarged view of one part of the structure of FIG. 9 (A)

FIG. 9(A) and 9(B) illustrate a fifth embodiment wherein the present invention is applied to a roof side weather strip, similarly to the first embodiment. A weather strip W11 has the configuration identical to that of the weather strip W4 of the first embodiment, and is composed of a base portion 58 and a sealing portion 59.

The base portion 58 is attached to a bottom wall 11 of a roof side rail 10 with an outer adhesive tape 60A an inner adhesive tape 60B which respectively extend in parallel relation to each other. Each of the adhesive tapes 60A and 60B is composed of a band-shaped foamed portion 62 of acrylic resin foamed material and adhesive layers 63 and 64 which are provided on both sides of the band-shaped foamed portion 62. The foamed portion 62 of the outer adhesive tape 60A is made soft so as to exhibit excellent deformability while the foamed portion 62 of the inner adhesive tape 60B is made harder than that of the adhesive tape 60A to exhibit excellent tensile strength. It is preferable to use a thicker adhesive tape as the outer so adhesive tape 60A, as compared with the inner adhesive tape 60B. In FIG. 9(A), reference numeral 65 denotes an opening trim attached to a flange 35 of the bottom wall 11, and 6 denotes a drip moulding.

The outer adhesive tape 60A exhibits good deformability so as to be bonded securely to the bottom wall 11, even if step-like surfaces exists therein, thereby achieving excellent sealing between the weather strip W11 and the bottom wall 11. The inner adhesive tape 60B exhibits strong securing properties to the bottom wall 11, even if the weather strip W11 is push by the closed door window pane 14 in such a direction as displace the weather strip W11 to a deviated position.

Figure 10:
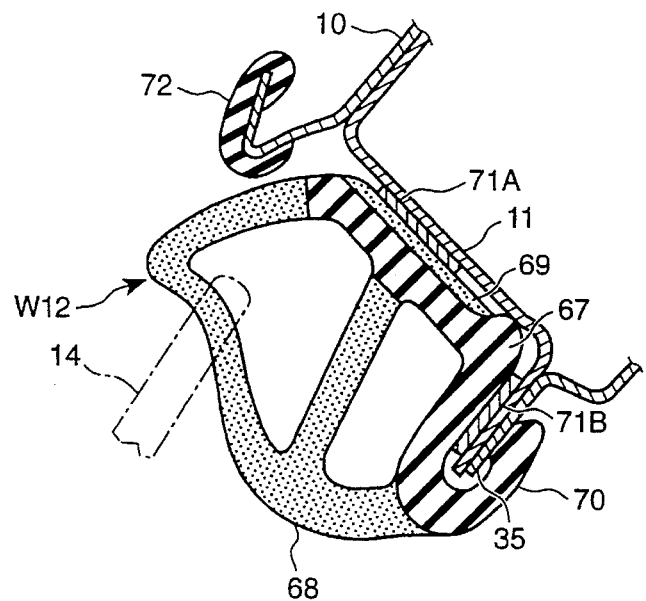
FIG. 10 is a cross-sectional view of a sixth embodiment of a structure in accordance with the present invention, taken along the line 2—2 of FIG. 1.

FIG. 10 illustrates a sixth embodiment of a structure in accordance with the present invention. As shown, a base portion 67 of a roof side weather strip W12 and an opening trim 70 are formed integrally of solid rubber. A sponge rubber layer 69 is formed integrally on a bottom surface of the base portion 67. The weather strip W12 is attached to a vehicle body by bonding the sponge rubber layer 69 to a bottom wall 11 of a roof side rail 10 with an adhesive tape 71A and bonding the opening trim 70 to a flange 35 with an adhesive tape 71B. The adhesive tape 71A is made of softer material than that of the adhesive tape 71B. Reference numeral 68 denotes a sealing portion to be pushed-up by a door window pane 14, and 72 denotes a moulding.

With the present embodiment, the weather strip W12 can be bonded to the roof side rail 10 at the appropriate two portions on the outer and inner sides of the weather strip W12. Since the base portion 67 is made of solid rubber, and the sponge rubber layer 69 is formed on the bottom surface of the base portion 67, the adhesive tape 71A can adhere securely to the sponge rubber layer 69. Upon attaching of the weather strip W12, a pushing force is applied to the adhesive tape 71A through the base portion 67 of solid rubber so that the adhesive tape 71A is bonded securely to the bottom wall 11.

Figure 11:
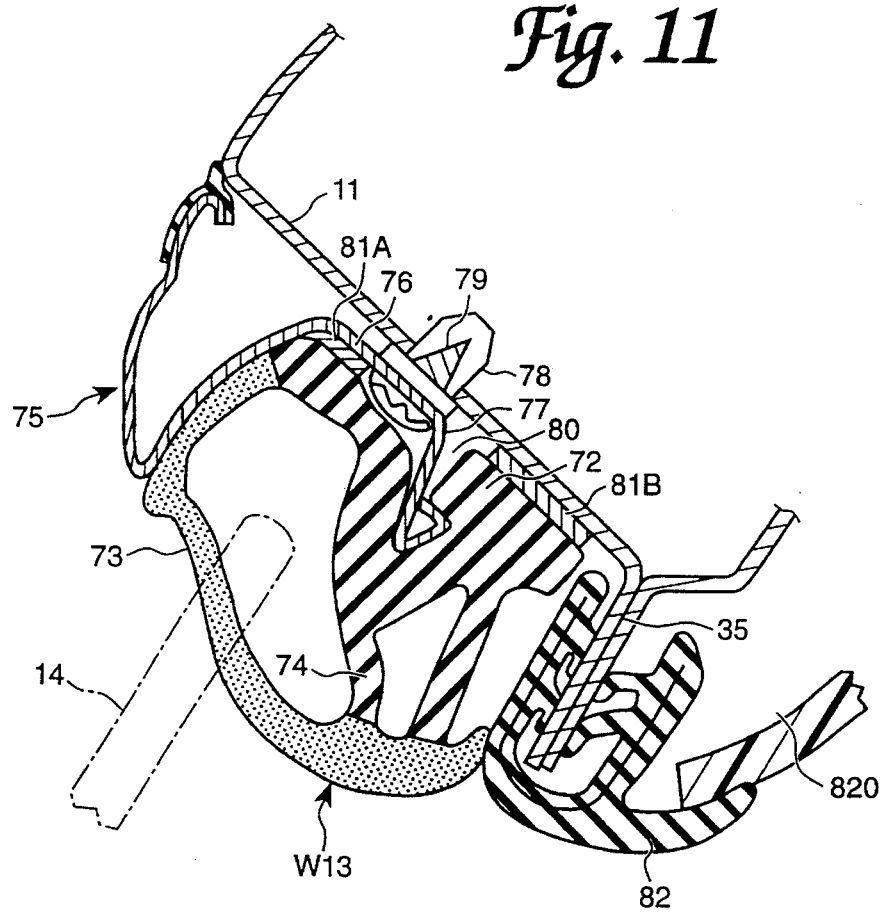
FIG. 11 is a cross-sectional view of a seventh embodiment of a structure in accordance with the present invention, taken along the line 2—2 of FIG. 1.

FIG. 11 illustrates a seventh embodiment of a weather strip structure provided in accordance with the present invention. As shown, a weather strip W13 is an extruded body of rubber, and has a thick base portion 72 made of solid rubber and tubular sealing portion 73 made of sponge rubber, which is adapted to be pushed-up by a door window pane 14. A bridge 74 is formed inside the sealing portion 73.

A bottom wall 11 of the roof side rail defining a door opening provides a flat attachment face for the weather strip W13. A moulding member 75 made of stainless steel sheet, covers an outer side surface of the weather strip W13. A base portion 76 of the moulding member 75 is flat, and the width thereof is less than-that of the bottom wall 11. Inner side portion of the moulding member 76 is bent into a predetermined configuration to form an engaging projection 77. The base portion of the moulding member 75 is secured to the bottom wall 11 with screws 79 and grommets 78. The engaging projection 77 of the thus secured moulding member 75 extends downwardly. An end of the engaging projection 77 has an arc-like configuration, and the width thereof is increased.

Near a widthwise center of the base portion 72 an engaging groove 80 is formed so as to face the engaging projection 77. The bottom of the engaging groove 80 is enlarged in conformity with the configuration of the engaging projection 77.

In attaching the weather strip W13, the engaging groove 80 of the weather strip W13 is first fitted onto the engaging projection 77 of the moulding member 75. Then, the outer part of the base portion 72 is bonded to the base portion 76 with an adhesive tape 81A while the inner part of the base portion 72 is bonded to the bottom wall 11 with another adhesive tape 81B.

A flange 35 protrudes downwardly from the bottom wall 11, and an opening trim 82 of a U-shaped cross-section is attached to the flange 35. A side edge of a ceiling trim 820 adapted to cover a ceiling of a vehicle body contacts an inside lip of the trim 82.

With the structure of the present embodiment, by fitting the engaging groove 80 onto the engaging projection 77, the weather strip W13 can be positioned on a predetermined place of the bottom wall 11 with good work efficiency and without any deviation. The adhesive tape 81A seals between the weather strip W13 and the moulding member 75 while the adhesive tape 81B seals between the weather strip W13 and the bottom wall 11 of the roof side rail. This arrangement enables improvement of sealing performance between the weather strip W13 and the vehicle body. Furthermore, this arrangement does not require retainers adapted to attach the weather strip, resulting in the structure being lightweight, and reducing the manufacturing costs.

In the case that the inner side surface of the moulding member 75 contacts the outer surface of the weather strip W13, and heads of the screws 79 project from the base portion 76 of the moulding member 75, as shown in the present embodiment, the space for the adhesive tape 81A limited.

Figure 12A:
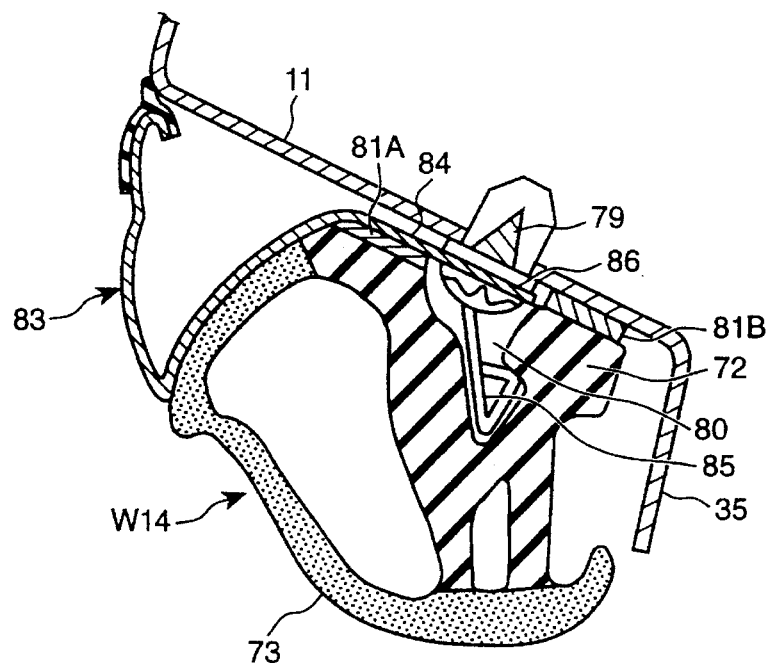
FIG. 12(A) is a cross-sectional view of an eighth embodiment of a structure in accordance with the present invention, taken along the line 2—2 of FIG. 1.
Figure 12B:
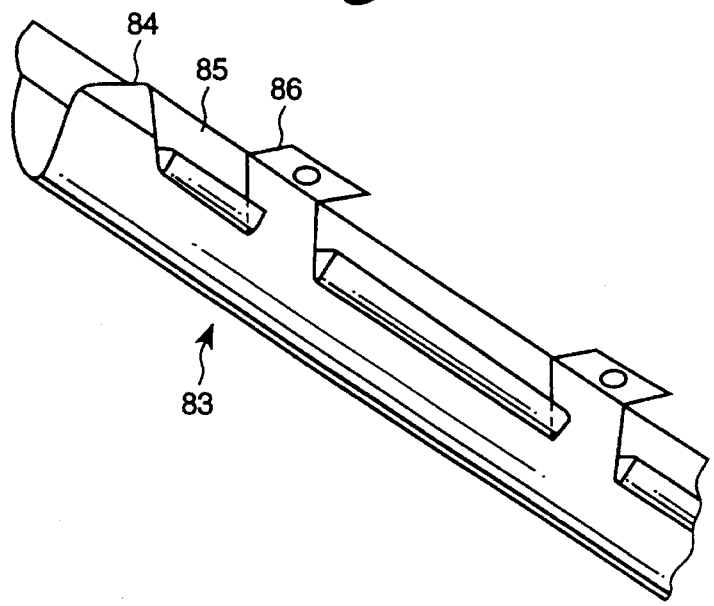
FIG. 12(B) is an enlarged view of one part of the structure of FIG. 12(A)

FIGS. 12(A) and 12(B) illustrate an eighth embodiment by which the above problem can be solved. As shown in FIG. 12(B), an engaging projection 85 of a moulding member 83 is cut downwards with predetermined spacings, and raised-up flush with a base portion 84. Then, bent ends are cut away to form a plurality of raised portions 86. These raised portions 86 are adapted to secure the moulding member 83 to the bottom wall 11 with screws 79. A weather strip W14 is substantially identical to the weather strip W13 of the seventh embodiment. With the eighth embodiment, as shown in FIG. 12(A), a sufficiently large space for the adhesive tape 81A is ensured in the base portion 84 of the moulding member 83 so that the adhesive tape 81A can be made wide.

Figure 13:
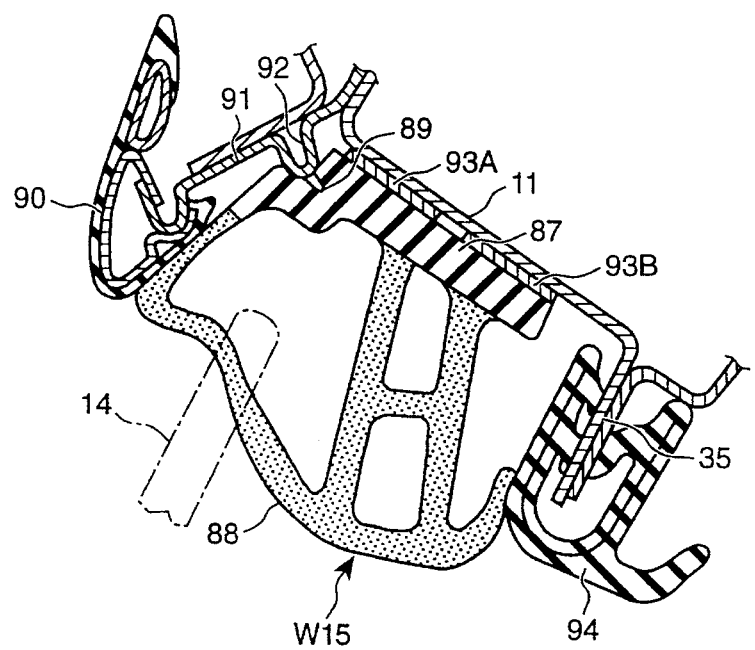
FIG. 13 is a cross-sectional view of a ninth embodiment of a structure in accordance with the present invention, taken along the line 2—2 of FIG. 1.

FIG. 13 illustrates a ninth embodiment of a weather strip structure provided in accordance with the present invention, a weather strip W15 has a tube-like configuration, and is composed of a base portion 87 made of solid rubber, which is adapted to be attached to a bottom wall 11 of a roof side rail, and a sealing portion 88 made of sponge rubber which is adapted to be pushed-up by a door window pane 14. The weather strip W15 is formed integrally by extrusion. A roof side moulding 90 having a V-shaped cross-section is attached along an outer side edge of the bottom wall 11. The roof side moulding 90 serves as a drip moulding. The base portion 87 of the weather strip W15 may be formed or synthetic resin.

The base portion 87 is made thick, and a groove 89 is formed in the outer side portion thereof. A projection 92 is formed in a base end portion 91 of the roof side moulding 90 so as to face the groove 89. The projection 9 engages with a stepped opening of the groove 89. The weather strip W15 is bonded to a bottom wall 11 of a roof side rail with band-shaped adhesive tapes 93A and 93B while engaging the groove 89 with the projection 92. An opening trim 94 is attached to a flange 35 protruding from the bottom wall 11 and contacts an inside lip of the sealing portion 88 of the weather strip W15.

With the structure of the ninth embodiment, the groove 89 of the weather strip W15 is engaged with the projection 92 of the roof side moulding 90. Then, the base portion 87 is pressed against the bottom wall 11 through the adhesive tapes 93A and 93B. This results in the weather strip W15 being attached to the vehicle body with good work efficiency and without any deviation.

Figure 14:
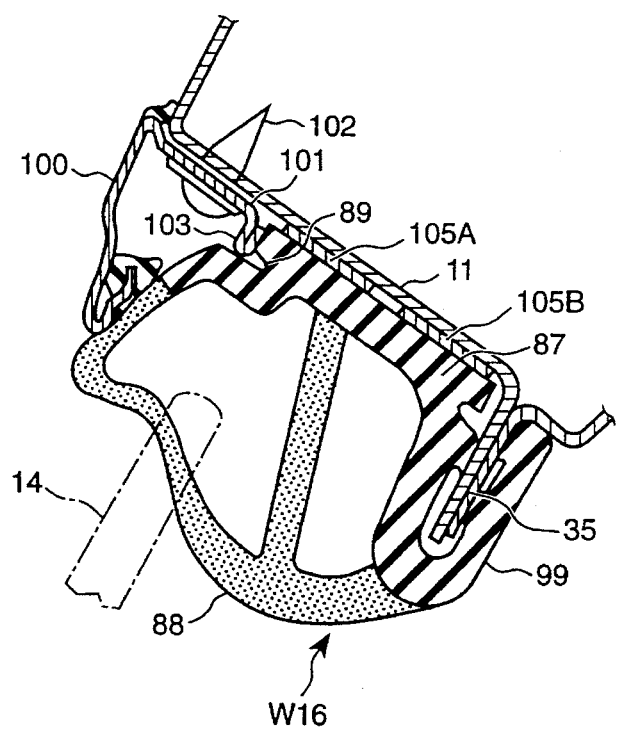
FIG. 14 is a cross-sectional view of a tenth embodiment of a structure in accordance with the present invention, taken along the line 2—2 of FIG. 1.

The roof side moulding 90 can have various other configurations than that of the preceding embodiments. For example, in a tenth embodiment illustrated in FIG. 14 (in the present embodiment and embodiments illustrated in FIG. 15 and 16, parts similar to those in FIG. 13 are given the same reference numerals as in FIG. 13), a base end portion 101 of a roof side moulding 100 is secured to an outer side edge of a bottom wall 11 of a roof side rail with screws 102. The roof side moulding 100 projects downwards to cover an outside surface of a weather strip W16. An inner end of the base end portion 101 of the roof side moulding 100 is bent downwardly at about right angles to form a projection 103 defining an engaging member.

The groove 89 is formed in an outer side surface of a weather strip W16. The weather strip W16 is formed integrally with an opening trim 99. The weather strip W16 is bonded to the bottom wall 11 with two adhesive tapes 105A and 105B. The remainder of the construction of the present embodiment is identical to that of the ninth embodiment.

With the present embodiment, in attaching the weather strip W16, the opening trim 99 is attached to a flange 35, and the base portion 87 of the weather strip W1 is pressed against the bottom surface 11 through the adhesive tapes 105A and 105B while engaging the groove 89 of the weather strip W16 with the projection 103 of the roof side moulding 100. This arrangement results in the weather strip W16 being attached to the vehicle body with good work efficiency and without any deviation from a predetermined attachment position.

Figure 15:
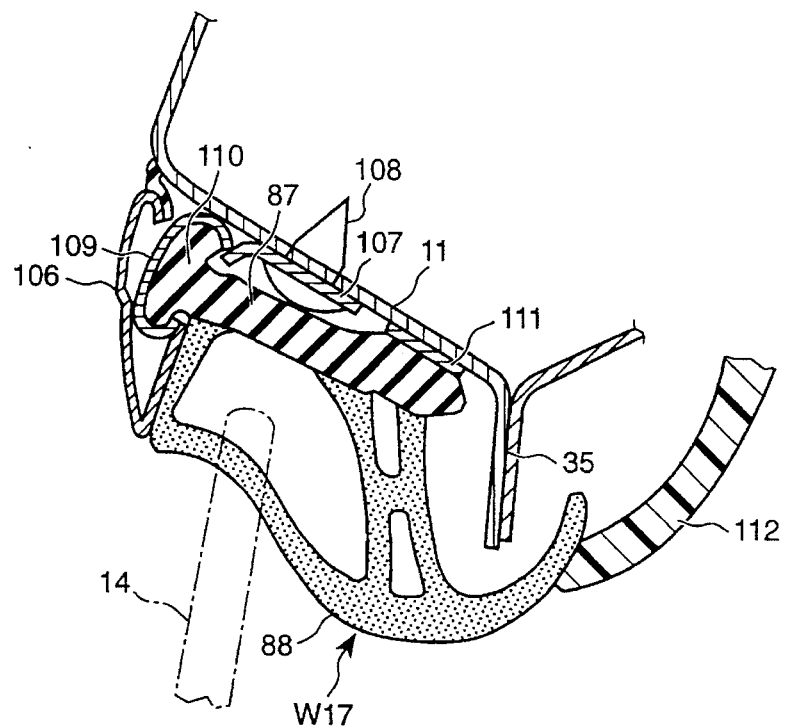
FIG. 15 is a cross-sectional view of an eleventh embodiment of a structure in accordance with the present invention, taken along the line 2—2 of FIG. 1.

FIG. 15 illustrates an eleventh embodiment of a structure in accordance with the present invention. As shown, a base end portion 107 of a roof side moulding 106 is secured near a widthwise center of a bottom wall 11 of a roof side rail with screws 108. An inner wall of the roof side moulding 106 has a concave 109 of a C-shaped cross-section as an engaging member with a weather strip W17.

The weather strip W17 is an extruded body having a base portion 87 made of solid rubber and a sealing portion 88 made of sponge rubber. A projection 110 is formed along an outer side surface of the thick base portion 87. The projection 110 has an outwardly enlarged cross-section, an is fitted in the concave 109. An inner part of the base portion 87 is bonded to the bottom wall 11 with an adhesive tape 111. A flange 35 of the bottom wall 11 is covered with a lip of the sealing portion 88 of the weather strip W17, and a ceiling trim 112 contacts the lip of the sealing portion 88.

With the present embodiment, by pushing the projection 110 of the weather strip W17 into the concave 109 of the roof side moulding 106, the weather strip W17 is hung from the roof side moulding 106. Then, the base portion 87 to which the adhesive tape 111 has been previously bonded is pressed against the bottom wall 11. This arrangement enables improvement of work efficiency of attaching the weather strip W17 to the vehicle body, as compared with that of the tenth embodiment.

Figure 16:
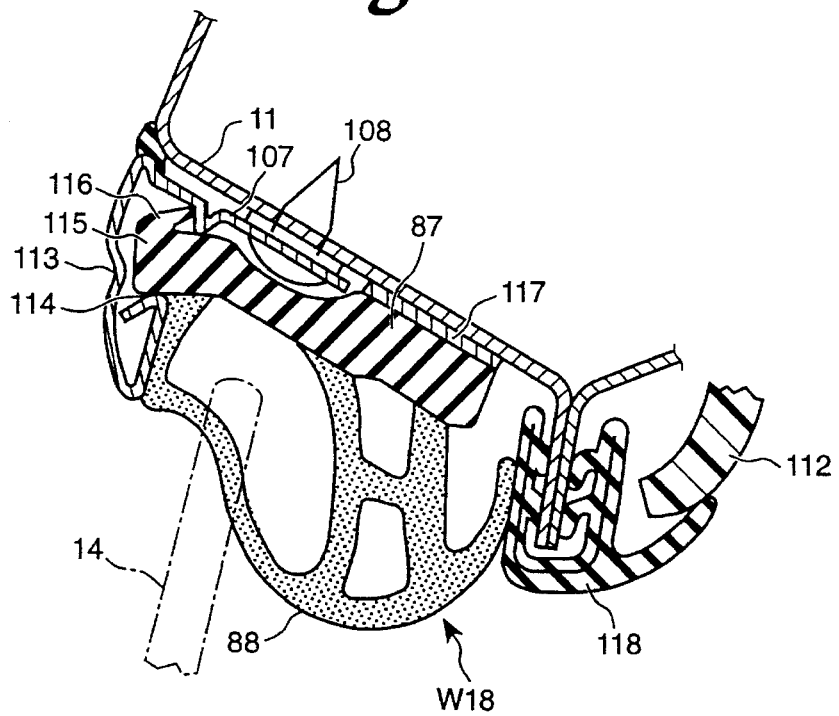
FIG. 16 is a cross-sectional view of a twelfth embodiment of a structure in accordance with the present invention, taken along the line 2—2 of FIG. 1.

FIG. 16 illustrates a twelfth embodiment of a weatherstrip structure provided in accordance with the present invention. As shown, a roof side moulding 113 has an opening 114 which opens at the position facing an outer side surface or a base portion 87 of a weather strip W18. The outer side surface of the base portion 87 projects outwardly to form projection 115 having an obliquely inwardly protruding claw 116. With the present embodiment, by pushing the projection 115 into the opening 114 of the roof side moulding 113, the claw 111 engages with an upper periphery of the roof side moulding 113 defining the opening 114, whereby the weather strip W18 can be hung from the roof side moulding 113. Then, the thus positioned weather strip W18 is bonded to the bottom wall 11 with an adhesive tape 117. Reference numeral 118 denotes an opening trim.

Figure 17:
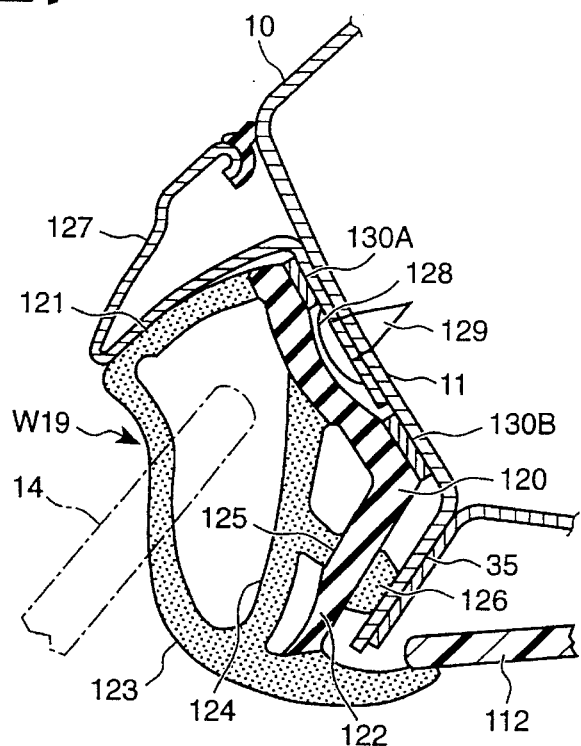
FIG. 17 is a cross-sectional view of a thirteenth embodiment of a structure in accordance with the present invention, taken along the line 2—2 of FIG. 1.

FIG. 17 illustrates a thirteenth embodiment of a weather strip structure provided in accordance with the present invention. As shown, a weather strip W19 is a tubular body composed of a base portion 120, an outer side wall 121, an inner side wall 122 and a sealing wall 123. Inside the tubular body, a bridge 124 connecting the base portion 120 to the sealing wall 123 and a bridge 125 connecting the bridge 124 to a central portion of the inner side wall 122 is formed. A stopper 126 projects from the central portion of the inner side wall 122. The base portion 120 and the inner side wall 122 are made of solid rubber while the remainder of the weather strip W19 is made of sponge rubber. The weather strip W19 thus constructed is formed integrally by extrusion.

A base end portion 128 of a roof side moulding 127 is secured to a widthwise center of a bottom wall 11 of a roof side rail 10 with screws 129. A main portion of the roof side moulding 127 has a V-shaped cross-section. The surface of an outer end of moulding 127 continues to that of the roof side rail 10. The weather strip W19 is positioned such that the base portion 120 covers heads of screws 129, and an outer part of the base portion 120 is bonded to the base end portion 128 of the roof side moulding 127 with a adhesive tape 130A while the inner part of the base portion 120 is bonded to the bottom wall 11 with an adhesive tape 130B.

In assembly, the weather strip W19 is first positioned by abutting the stopper 126 and the outer side wall 121 on the flange 35 protruding from the bottom wall 11 and the roof side moulding 127, respectively. In the drawing, reference numeral 112 denotes a ceiling trim adapted to cover a ceiling of a vehicle compartment.

When a door is closed, the sealing wall 123 is pushed inwardly by a door window pane 14. In this case, the door window pane 14 is installed at an inwardly offset position due to variations in the mounted position of the door, the weather strip W19 is likely to be excessively pushed by the window pane 14 and tilted inwardly thereby. With the present embodiment, this tilting of the weather strip W19 is, however, received by the inner side wall 122 which abuts the flange 35 through the stopper 126, and the door window pane 14 is pushed back into nearly an offset position, thereby enabling good sealing properties.

When a door is forcibly closed, the outer side wall 121 of the weather strip W19 is pulled inwardly by the window pane 14, and an outer end part of the base portion 120 is likely to separate from the base end portion 128 of the roof side moulding 127. With the present embodiment, the window pane 14 is received by the flange 35 through the bridge 125 and the stopper 126 to be prevented from being displaced inwardly. This arrangement results in the outer side wall 121 being not forcibly pulled inwardly, and the adhesive tape 130A being prevented from separating from the roof side moulding. Furthermore, deformation of the weather strip W19 due to the repetition of the forcible closing of door can be also prevented.

Figure 18:
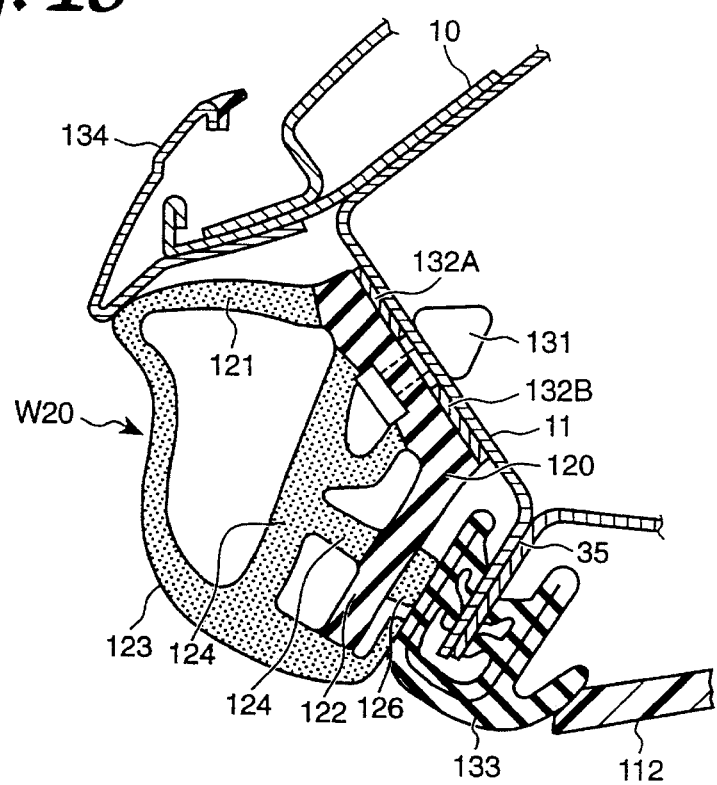
FIG. 18 is a cross-sectional view of a fourteenth embodiment of a structure in accordance with the present invention taken along the line 2—2 of FIG. 1.

FIG. 18 illustrates a fourteenth embodiment of weather strip structure provided in accordance with the present invention. In the drawing, similar parts to those in FIG. 17 are given the same reference numerals as in FIG. 17. As shown, a base portion 120 of a weather strip W20 is secured to a bottom wall 11 of a roof side rail 10 with clips 131 and is bonded thereto on both sides of the clips 131 with adhesive tapes 132A and 132B. An opening trim 133 is attached to a flange 35 protruding from the bottom wall 11. A stopper 126 is formed in an inner side wall 122 of the weather strip W20 which faces the opening trim 133 so as to abut the side surface thereof. A roof side moulding 134 is attached to roof side rail 10. An outer side wall 121 of the weather strip W20 extends from the base portion 120 frontwards and contacts the roof side moulding 134. The remainder of the construction of the present embodiment is substantially identical to that of the thirteenth embodiment. With the present embodiment, substantially the same operational advantages as those of the thirteenth embodiment are achieved.

Figure 19:
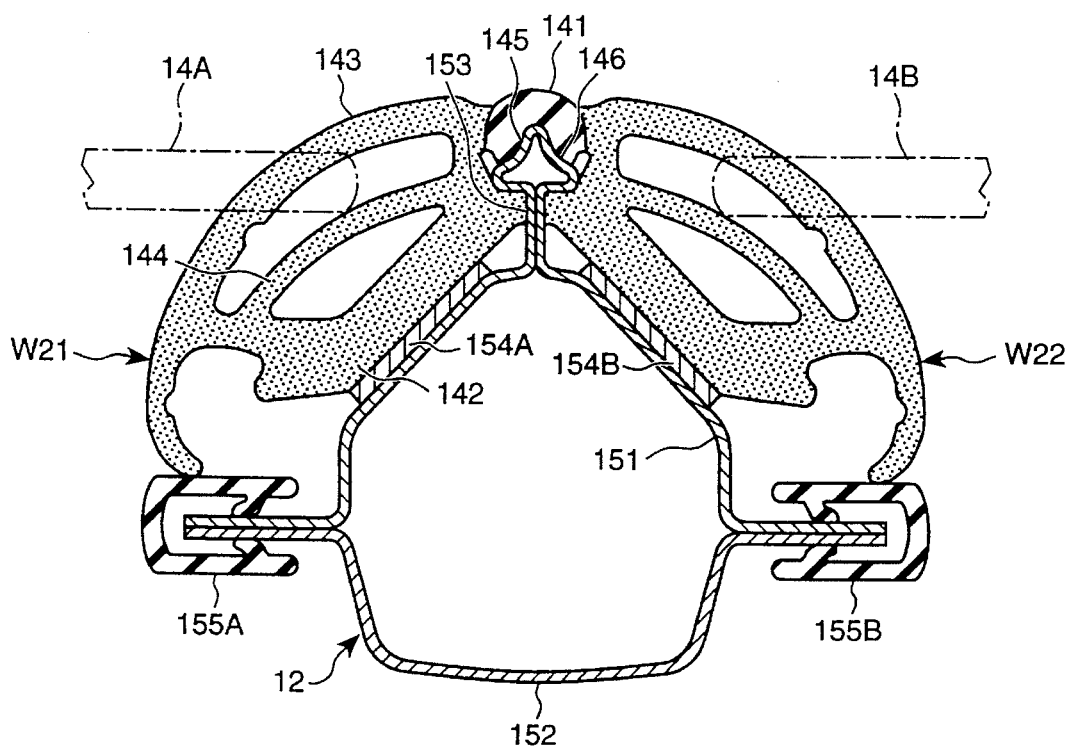
FIG. 19 is a cross-sectional view of a fifteenth embodiment of a structure in accordance with the present invention, taken along the line 3—3 of FIG. 1.

FIG. 19 illustrates a fifteenth embodiment of a weather strip structure provided in accordance with the present invention, wherein a weather strip is attached along a center pillar 12. As shown, a first weather strip W21, adapted to seal a rear end edge of a front door window pane 14A, is integrally connected to a second weather strip W22 adapted to seal a front end edge of a rear door window pane 14B through a connecting part 141. The connecting part 141 is made of solid rubber and acts as a pillar moulding.

The first and second weather strip W21 and W22 are made of sponge rubber and have substantially the same construction. Each of the weather strips and W22 is a tubular body composed of a base portion 142 and a sealing wall 143. A bridge 144 is further provided to separate the inside of each weather strip to the side of the base portion 142 and the side of the sealing wall 143. The connecting part 141 has a generally circular cross-section, and has a groove 145 along its inner surface. Opposed end surfaces of the weather strips W21 and W22 and the connecting part 141 define a cavity 146.

The center pillar 12 is composed of an outer panel 151 and an inner panel 152 which define a closed cross-section. The outer panel 151 has an L-shaped cross-section. A projection 153 is provided at a top of the outer panel 151 integrally therewith. An end of the projection 153 has a generally triangular cross-section, and acts as an engaging member. The outer panel 151 and the inner panel 152 are joined together to form frontwardly and rearwardly protruding flanges, and trims 155A and 155 are respectively attached to these flanges.

The weather strips W21 and W22 are respectively bonded to the center pillar 12 with adhesive tapes 154A and 154B. In attaching the weather strips W21 and W22, the groove 145 of the connecting part 141 is fitted onto the end of the projection 153. Then, the weather strips W21 and W22 are spread apart outwardly with the groove 145 engaged with the projection 153. Next, the adhesive tape 154A which has been previously bonded to the weather strips W21 is bonded to one tapered surface of the outer panel 151 of the center pillar 12. The weather strip W22 is similarly bonded to another tapered surface of the outer panel 151 with the adhesive tape 154B. Thus, the weather strips W21 and W22 are attached to the center pillar 12 without any deviation from a predetermined position with good work efficiency. The adhesive tapes 154A and 154B may be previously bonded to the center pillar 12.

Figure 20:
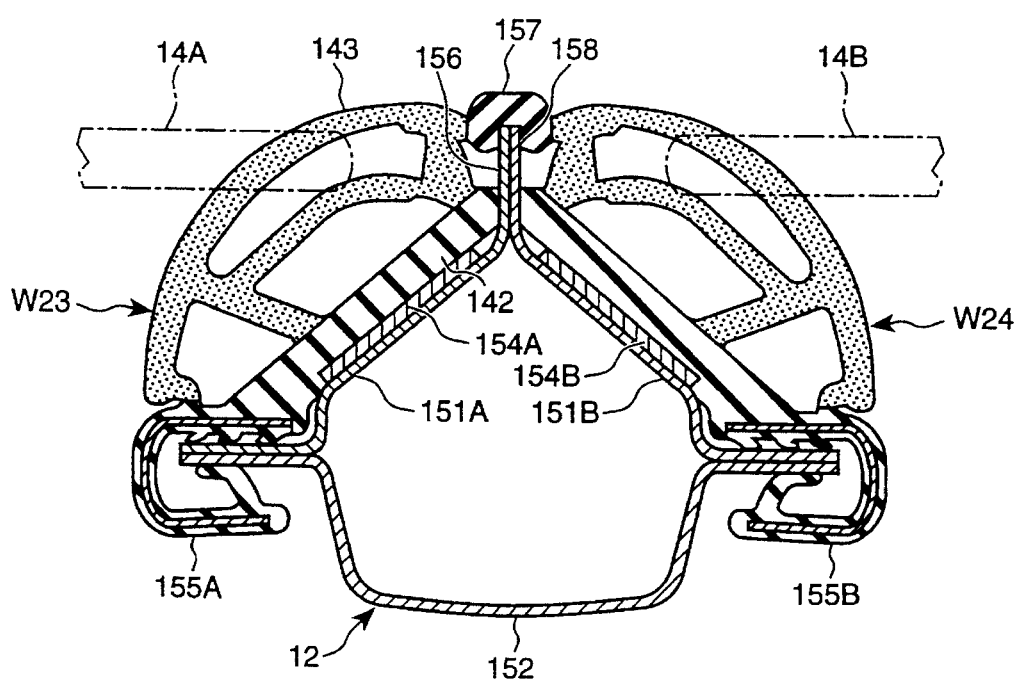
FIG. 20 is a cross-sectional view of a sixteenth embodiment of a structure in accordance with the present invention, taken along the line 3—3 of FIG. 1.

FIG. 20 illustrates a sixteenth embodiment structure provided in accordance with the present invention. An outer panel of the center pillar 12 is composed of two outer panels 151A and 151B. Flanges of these outer panels 151A and 151B are joined together to form an engaging projection 156. By fitting a groove 158 of a connecting part 157 onto an end of the engaging projection 156, the weather strip W22 is positioned on the center pillar 12. Base portions 142 of the weather strips W23 and W24 are made of solid rubber. The remainder of the construction of the present embodiment is substantially the same as that of the fifteenth embodiment, and similar parts to those of FIG. 19 are given the same reference numerals as in FIG. 19.

Figure 21:
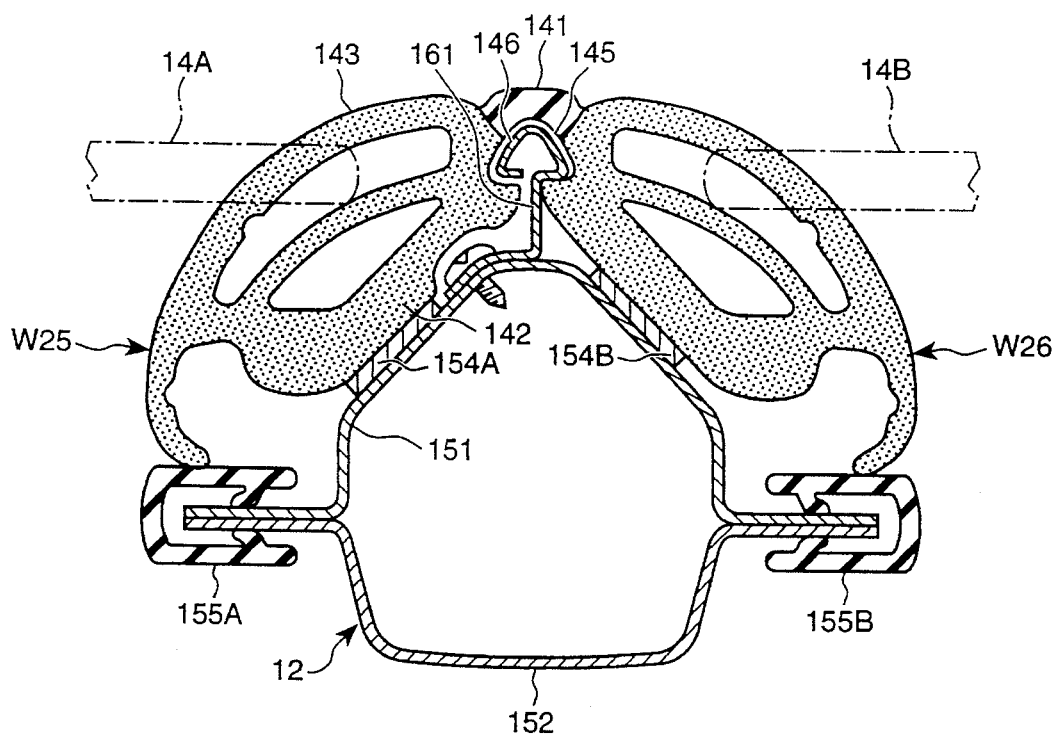
FIG. 21 is a cross-sectional view of a seventeenth embodiment of a structure in accordance with the present invention, taken along the line 3—3 of FIG. 1.

FIG. 21 illustrates a seventeenth embodiment of a weather strip structure provided in accordance with the present invention. As shown, an engaging projection 161 is secured to an outer panel 151 of a center pillar 12 with screws. An end portion of the projection 161 has a generally triangular cross-section. A groove 145 to a connecting part connecting the weather strips W25 and W27, and opposed end surfaces of the weather strips W25 and W26, which define a cavity 146, are fitted onto the end of the projection 161, thereby engaging the weather strips W25 and W26 with the center pillar 12 to position the weather strips W25 and W26 on the center pillar 12. The remainder of the construction of the seventeenth embodiment is substantially the same as that of the fifteenth embodiment. Similar parts to those in FIG. 19 are given reference numerals as in FIG. 19. With the present embodiment, it is unnecessary to alter the construction of the conventional center pillar.

Figure 22:
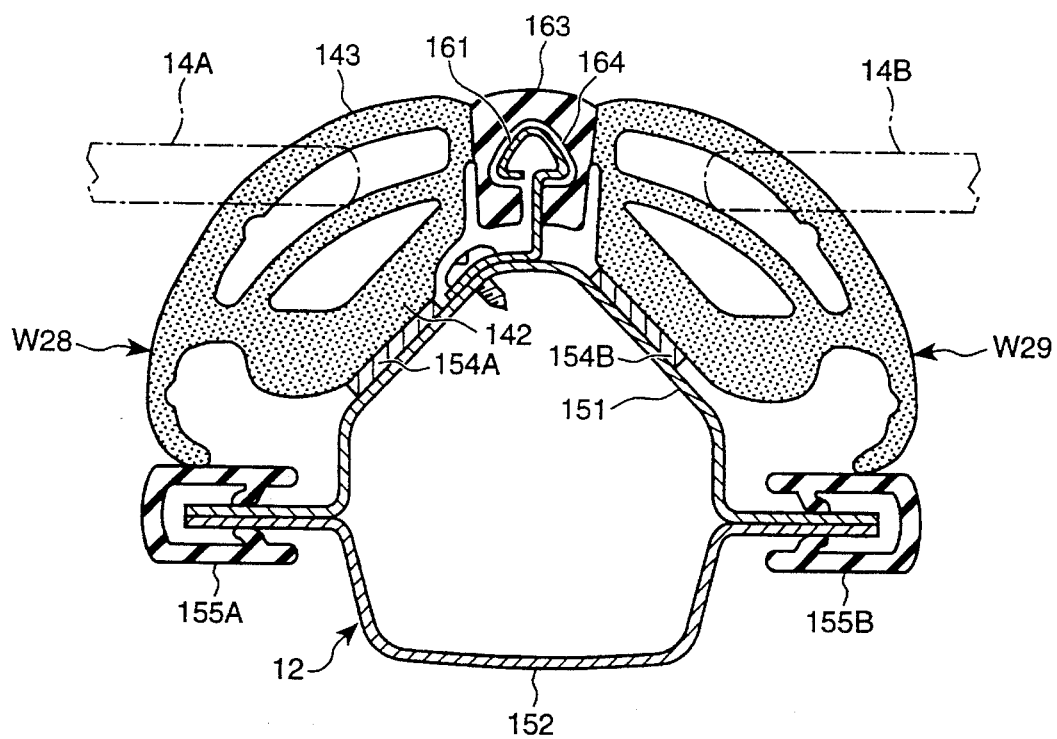
FIG. 22 is a cross-sectional view of an eighteenth embodiment of a structure in accordance with the present invention, taken along the line 3—3 of FIG. 1.

FIG. 22 illustrates an eighteenth embodiment of a weather strip structure provided in accordance with the present invention. As shown, an engaging projection 161 is identical to that of seventeenth embodiment. A connecting part 163 has a thickness greater than that of the connecting part 141 of the seventeenth embodiment, and a groove 164 is formed inside the connecting part 163 for engaging with the triangular end of the engaging projection 161.

With the present embodiment, merely upper parts of side surfaces of the connecting part 163 are connected to the weather strips W28 and W29. This arrangement enables the weather strips W28 and W29 to be easily spread apart for attachment, although the connecting part 163 is thick. Further, by inserting the end of the engaging projection 161 into the groove 164 of the connecting part 162, the weather strips W28 and W29 are positioned with certainty on the center pillar 12. The remainder of the construction of the present embodiment is identical to that of the seventeenth embodiment.

Figure 23:
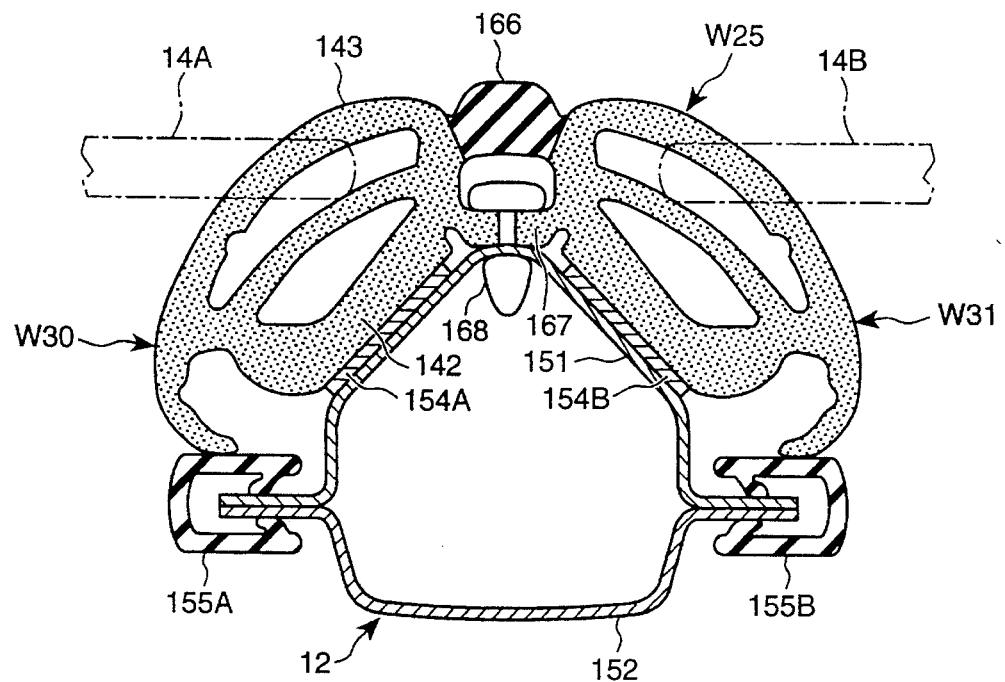
FIG. 23 is a cross-sectional view of a nineteenth embodiment of a structure in accordance with the present invention, taken along the line 3—3 of FIG. 1.

FIG. 23 illustrates a nineteenth embodiment of a weather strip structure provided in accordance with the present invention. As shown, weather strips W30 and W31 are connected by an outer connecting part 166 made of solid rubber and an inner connecting part 167 made of sponge rubber provided inside the outer connecting part 166. The inner connecting part 167 is secured to a top of an outer panel 151 of the center pillar 12 with clips 168, thereby engaging the weather strips W30 and W31 with the center pillar 12 and positioning the strips W30 and W31 on the center pillar 12.

The inner connecting part 167 has a plurality of through-holes with predetermined spacings. The clips 168 are pushed into the through-holes until tip ends thereof protrude from the inner connecting part 167. Then, the outer connecting part 166 is pressed against heads of clips 168 to press-fit the clips 168 into holes formed at the top of the outer panel 151 of the center pillar 12, thereby engaging the weather strips W30 and W31 with the center the pillar 12 and positioning them on the center pillar 12. The remainder of the construction of the present embodiment is identical to that of the fifteenth embodiment.

Figure 24:
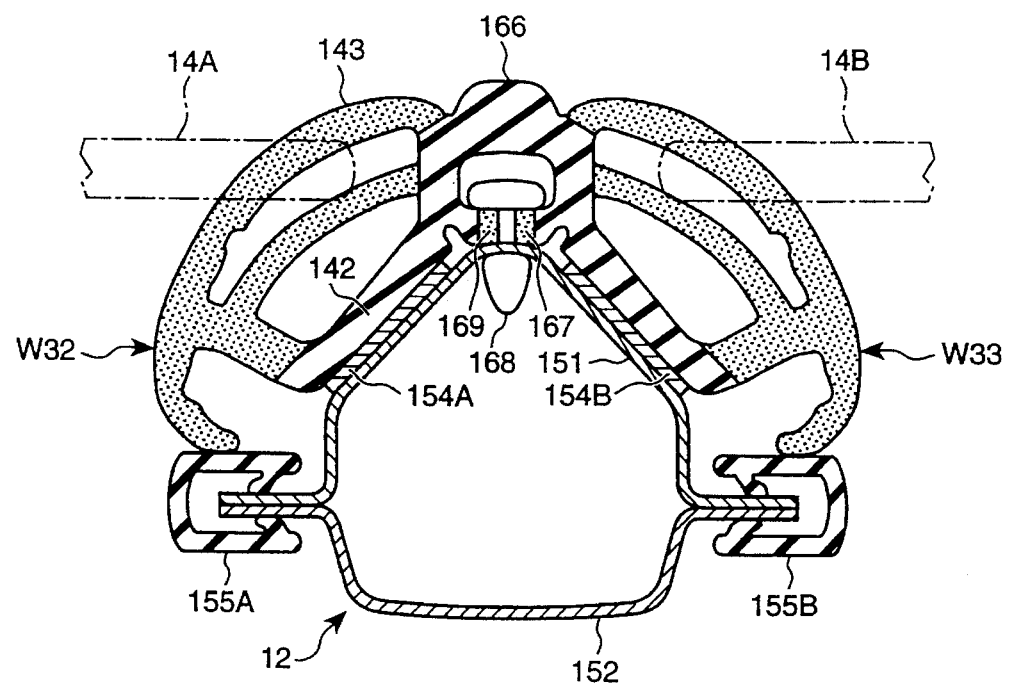
FIG. 24 is a cross-sectional view of a twentieth embodiment of a structure in accordance with the present invention, taken along the line 3—3 of FIG. 1.

FIG. 24 illustrates a twentieth embodiment of a weather strip structure provided in accordance with the present invention. As shown, base portions 142 of weather strips W32 and W33, an outer connecting part 166 and an inner connecting part 167 are integrally formed of solid rubber. A central portion of the inner connecting part 166 through which clips 168 are to be inserted is made of sponge rubber 169. The thus formed solid rubber portions 142, 166, 167 connect the weather strips W32 and W33 into an integral body, and accordingly, enables improvement of the stability of attaching of the weather strips while the soft sponge rubber 169 enables the clips 168 to be easily inserted through the inner connecting part 167.

Figure 25:
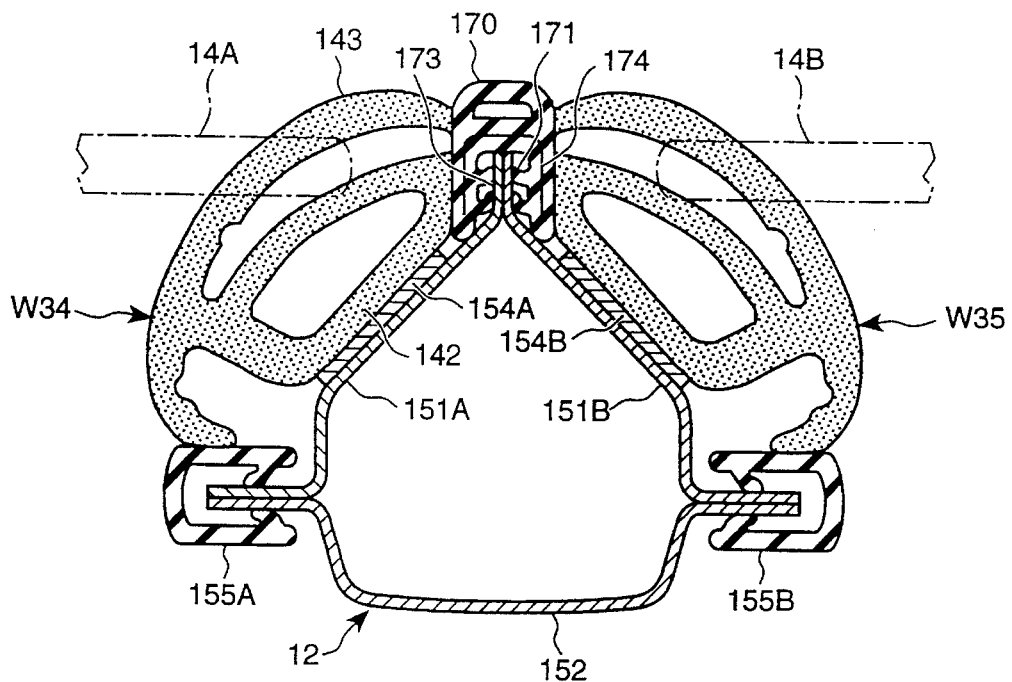
FIG. 25 is a cross-sectional view of a twenty-first embodiment of a structure in accordance with the present invention, taken along the line 3—3 of FIG. 1.

FIG. 25, illustrates a twenty-first embodiment of a weather strip structure provided in accordance with the present invention. A connecting part 170, which connects the weather strips W34 and W35, made of sponge rubber, to each other, is made of solid rubber, and has a U-shaped cross-section similar to that of trims 155A and 155B attached to flanges of a center pillar 12. The connecting part 170 acts as a moulding. Lips 171 project inwardly from opposed inner surfaces of the connecting part 170, and hold a flange 173 formed by joining outer panels 154A and 154B of the center pillar 12 thereby positioning the weather strips W34 and W35 on the center pillar 12. A U-shaped core metal 174 is embedded in the connecting part 170. With the present embodiment, the connecting part 170 can be attached to the center pillar 12 with greater certainty. The remainder of the construction of the present embodiment is substantially the same as that of the fifteenth embodiment. Adhesive tapes 154A and 154B may be separated into a plurality of tapes, respectively.

Figure 26:
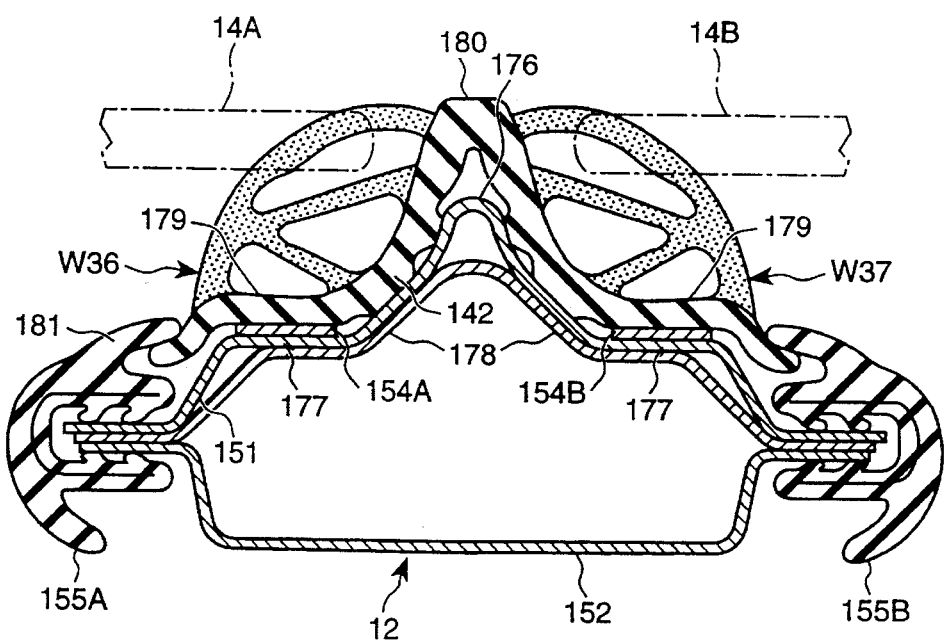
FIG. 26 is a cross-sectional view of a twenty-second embodiment of a structure in accordance with the present invention, taken along the line 3—3 of FIG. 1.

FIG. 26 illustrates a twenty-second embodiment of a structure provided in accordance with the present invention. As shown, a center pillar 12 has a width greater than that of the preceding embodiments to improve the strength of a vehicle body against collision. An outer panel 151 has a central convex part 176, and flat parts 177 on the front and rear sides of the convex part 176. A reinforcement 178 is provided inside the outer panel 151 extending therealong. Flanges of the outer panel 151, reinforcement 178 and inner panel 152 are superimposed on each other and welded together, and trims 155A and 155B are attached thereto.

Weather strips W36 and W37 have an integral base portion 142 made of solid rubber, which has a configuration conforming to the outer panel 151 of the center pillar 12. Sealing portions of the weather strips W36 and W37 are made of sponge rubber. The base portion 142 has peripheral flat part 179 disposed opposite the flat parts 177 of the outer panel 151. A protruding center portion 180 of the base portion 142 has a groove along an inner surface thereof.

Flat parts 179 of the base portion 142 of the weather strips W36 and W37 are respectively bonded to the flat parts 177 of the other panel 151 of the center pillar 12 with adhesive tapes 154A and 154B. Trims 155A and 155B respectively have lips 181 projecting from an outer side wall thereof for covering ends of the weather strips W36 and W37.

In attaching the weather strips W36 and W37, the center portion 180 of the base portion 142 is engaged with a projecting end of the central convex portion 176 of the center pillar 12, thereby positioning the weather strips W36 and W37 on the center pillar 12. Then, a covering is removed from each of the adhesive tapes 154A and 154B which have been previously bonded to the flat parts of the weather strips W36 and W37 are pressed against the flat parts 177 of the center pillar 12, whereby the weather strip W36 and W37 are bonded to the flat parts 177 of the center pillar 12 with the adhesive tapes 154A and 154B.

With the present embodiment, the center pillar 12 and the weather strips W36 and W37 respectively have bonding surfaces extending along a body surface. Accordingly, by slightly spreading apart the weather strips W36 and W37 outwardly, the covering can be easily removed from the adhesive tapes 154A and 154B, as compared with the case where the bonding surfaces extending obliquely with respect to the body surface. This arrangement results in the weather strips being prevented from disengaging from the center pillar 12 during the removing work of the coverings, and accordingly; simple engaging structure will do. Generally, the adhesive tapes 154A and 154B are bonded by pressing the weather strips W36 and W37 with a roller or the like. With the present embodiment, the above pressing work of the weather strip W36 and W37 may be performed in the same direction, so that good work efficient can be achieved. The spaces between the trims 155rA and 155B and the weather strips W36 and W37 are covered with lips 181 projecting from the trims 155A and 155B. The structure of the present invention is preferably applicable to a center pillar having a large width.

While the invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A structure for attachment of a weather strip to an opening of a vehicle body, which is opened and closed by a closing member, the weather strip having a base portion, the structure comprising a plurality of adjacent, double-sided adhesive tapes bonding the base portion to the vehicle body in a longitudinal direction thereof, an outermost double-sided adhesive tape of said plurality of double-sided adhesive tapes having a thickness greater than a thickness of an innermost double-sided adhesive tape.

2. The structure according to claim 1, wherein the weather strip is constructed and arranged for attachment to a pillar and a bottom wall of a roof side rail, which define a door opening of said vehicle body.

3. The structure according to claim 1, wherein said plurality of double-sided adhesive tapes include two adhesive tapes, said outermost double-sided adhesive tape having a thickness of 1.2 mm to 1.6 mm, and said innermost double-sided adhesive tape having a thickness of 0.4 mm to 0.8 mm.

4. The structure according to claim 1, wherein said outermost double-sided adhesive tape is made of material softer than a material of said innermost double-sided adhesive tape.

5. An attaching system for securing a weather strip having a base about an opening of a vehicle body, which is opened and closed by a closing member, said system including a retainer attached to said vehicle body by a plurality of screws, said retainer including a restraining portion, said weather strip including an engaging member extending from said base, said engaging member interfitting with said restraining portion to provide support for a portion of said weather strip, said system further including a double-sided adhesive tape bonding a portion of said base to said vehicle body.

6. An attaching system according to claim 5, wherein the weather strip is constructed and arranged for attachment to a bottom wall of a roof side rail, which defines a door opening of the vehicle body, said retainer comprises a molding member and said restraining portion comprises an engaging projection formed in a base end portion of said molding member, which is secured to said bottom wall of said roof side rail, and said engaging member of said weather strip comprises a shaped groove formed in a bottom surface of said base of the weather strip opposite to said engaging projection.

7. An attaching system according to claim 5, wherein said weather strip is constructed and arranged for attachment to a bottom wall of a roof side rail, which defines a door opening of the vehicle body, said retainer comprises a molding member and said restraining portion comprises an engaging groove formed in an inner wall of said molding member opposite to an outer end of said base of the weather strip, and said engaging member of said weather strip being an engaging projection formed in said outer end of said base of the weather strip, which is shaped to be inserted into and engaged with said engaging groove.

8. An attaching system according to claim 5, wherein the weather strip is constructed and arranged for attachment to a bottom wall of a roof side rail, which defines a door opening of the vehicle body, said retainer comprises a molding member and said restraining portion comprises an opening defined between a flange protruding from an inner side edge of said molding member and a depending outer portion thereof, said engaging member comprising a projection formed at an outer end of said base such that said engaging projection slidably interfits into said opening to position and support the weather strip on the vehicle body.

9. An attaching system according to claim 8, wherein said engaging projection is made of elastic material.

10. An attaching system according to claim 5, wherein said base portion of the weather strip is bonded to said bottom wall of said roof side rail with two double-sided adhesive tapes.

11. An attaching system according to claim 5, wherein the weather strip is constructed and arranged for attachment along a center pillar of a vehicle body, the weather strip being composed of a first weather strip for attachment along a front part of said center pillar, a second weather strip for attachment along a rear part of said center pillar, and a connecting part connecting said first and second weather strips in a parallel relation, said engaging member and said restraining portion being respectively formed at widthwise centers of said connecting part and said center pillar to position the weather strip on said center pillar; each of said first and second weather strips including a base bonded to an outside surface of said center pillar on said front and rear parts, respectively, with double-sided adhesive tape.

12. An attaching system according to claim 11, wherein said outside surface of said center pillar has a central protruding convex part and flat parts, each extending frontwardly and rearwardly on both sides of said central convex part, said base portion of each of said first and second weather strips having flat part opposite to each of said flat parts of said center pillar, said central convex part of said center pillar engaging with said connecting part of said weather strip to position said weather strip on said center pillar, said flat part of said base portion of each of said first and second weather strips being bonded to each of said flat parts of said center pillar with said double-sided adhesive tape.

13. An attaching system as in claim 5 wherein said retainer comprises an exteriorly extending molding that at least partially covers an outer part of said weather strip.

* * * * *